(12) United States Patent
Kondo et al.

(10) Patent No.: US 12,222,439 B2
(45) Date of Patent: Feb. 11, 2025

(54) ALIASING DETERMINATION DEVICE

(71) Applicant: DENSO CORPORATION, Kariya (JP)

(72) Inventors: Katsuhiko Kondo, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 278 days.

(21) Appl. No.: 17/653,437

(22) Filed: Mar. 3, 2022

(65) Prior Publication Data

US 2022/0187422 A1 Jun. 16, 2022

Related U.S. Application Data

(63) Continuation of application No. PCT/JP2020/032912, filed on Aug. 31, 2020.

(30) Foreign Application Priority Data

Sep. 5, 2019 (JP) ................. 2019-162006

(51) Int. Cl.
- *G01S 7/40* (2006.01)
- *G01S 7/35* (2006.01)
- *G01S 13/931* (2020.01)

(52) U.S. Cl.
CPC ........ *G01S 7/40* (2013.01); *G01S 7/35* (2013.01); *G01S 13/931* (2013.01)

(58) Field of Classification Search
CPC .............. G01S 7/35; G01S 7/40; G01S 13/931
USPC ........................................................ 342/173
See application file for complete search history.

(56) References Cited

U.S. PATENT DOCUMENTS

| | | | | |
|---|---|---|---|---|
| 2014/0002296 A1* | 1/2014 | Izumi | ............... | G01S 13/345 342/149 |
| 2017/0212205 A1* | 7/2017 | Bialer | ............... | G01S 3/50 |
| 2017/0261601 A1* | 9/2017 | Takaki | ............... | G01S 13/931 |
| 2017/0307730 A1* | 10/2017 | Baba | ............... | G08G 1/166 |
| 2018/0118201 A1* | 5/2018 | Matsunaga | ............... | B60T 7/12 |
| 2018/0356498 A1* | 12/2018 | Stachnik | ............... | G01S 7/2921 |
| 2019/0025405 A1* | 1/2019 | Liu | ............... | G01S 7/4026 |
| 2019/0107602 A1* | 4/2019 | Kitamura | ............... | G06N 20/00 |

FOREIGN PATENT DOCUMENTS

JP 2018-091785 A 6/2018

* cited by examiner

*Primary Examiner* — Bernarr E Gregory
*Assistant Examiner* — Samarina Makhdoom
(74) *Attorney, Agent, or Firm* — Maschoff Brennan

(57) ABSTRACT

An information acquisition section repeatedly acquires observation point information including an observation direction from a radar device. An axial misalignment acquisition section acquires an axial misalignment amount of an actual mounting direction representing the actual orientation of the radar device with respect to a reference mounting direction of the radar device. An aliasing calculation section calculates an aliasing direction of the observation direction included in the observation point information. An instantaneous determination section determines, as an actual direction, one of the observation direction and the aliasing direction that is closer to the reference mounting direction, which is estimated from the axial misalignment amount and the actual mounting direction.

8 Claims, 11 Drawing Sheets

REFERENCE MOUNTING DIRECTION
DIRECTIVITY
RADAR FRONT

PROPER OBJECT DETECTION RANGE
$\Phi = \beta i$
$\Phi = \alpha i$
$d\beta i$
$d\alpha i$
$\gamma$
$\Phi = 0$
REFERENCE MOUNTING DIRECTION
HORIZONTAL DIRECTION
MEASUREMENT ANGLE RANGE
(AXIALLY MISALIGNED OBJECT DETECTION RANGE)

PROPER OBJECT DETECTION RANGE

AXIALLY MISALIGNED OBJECT DETECTION RANGE

DETECT AND CORRECT

DETECT AND DO NOT CORRECT

ALIASING DETERMINATION DEVICE

CROSS-REFERENCE TO RELATED APPLICATION

The present application is a continuation application of International Application No. PCT/JP2020/032912, filed Aug. 31, 2020, which claims priority to Japanese Patent Application No. 2019-162006, filed Sep. 5, 2019. The contents of these applications are incorporated herein by reference in their entirety.

BACKGROUND

1. Technical Field

The present disclosure relates to a technique for determining phase aliasing in a direction observed by a radar device.

2. Related Art

For example, there is a technique of obtaining a correct direction by using a technique of tracking an object depending on the presence/absence of historical connection, extracting an observed value with the historical connection to a predicted value that has been performed aliasing correction when the predicted value is out of the measurement angle range, and performing aliasing correction on the extracted observed value.

SUMMARY

The present disclosure provides an aliasing determination device. As an aspect of the present disclosure, an aliasing determination device includes an information acquisition section, an axial misalignment acquisition section, an aliasing calculation section, and an instantaneous determination section. The information acquisition section repeatedly acquires observation point information including an observation direction from a radar device. The axial misalignment acquisition section acquires an axial misalignment amount of an actual mounting direction representing the actual orientation of the radar device with respect to a reference mounting direction of the radar device. The aliasing calculation section calculates an aliasing direction of the observation direction included in the observation point information. The instantaneous determination section determines, as an actual direction, one of the observation direction and the aliasing direction that is closer to the reference mounting direction, which is estimated from the axial misalignment amount and the actual mounting direction.

DETAILED DESCRIPTION OF THE PREFERRED EMBODIMENTS

Figure 1:
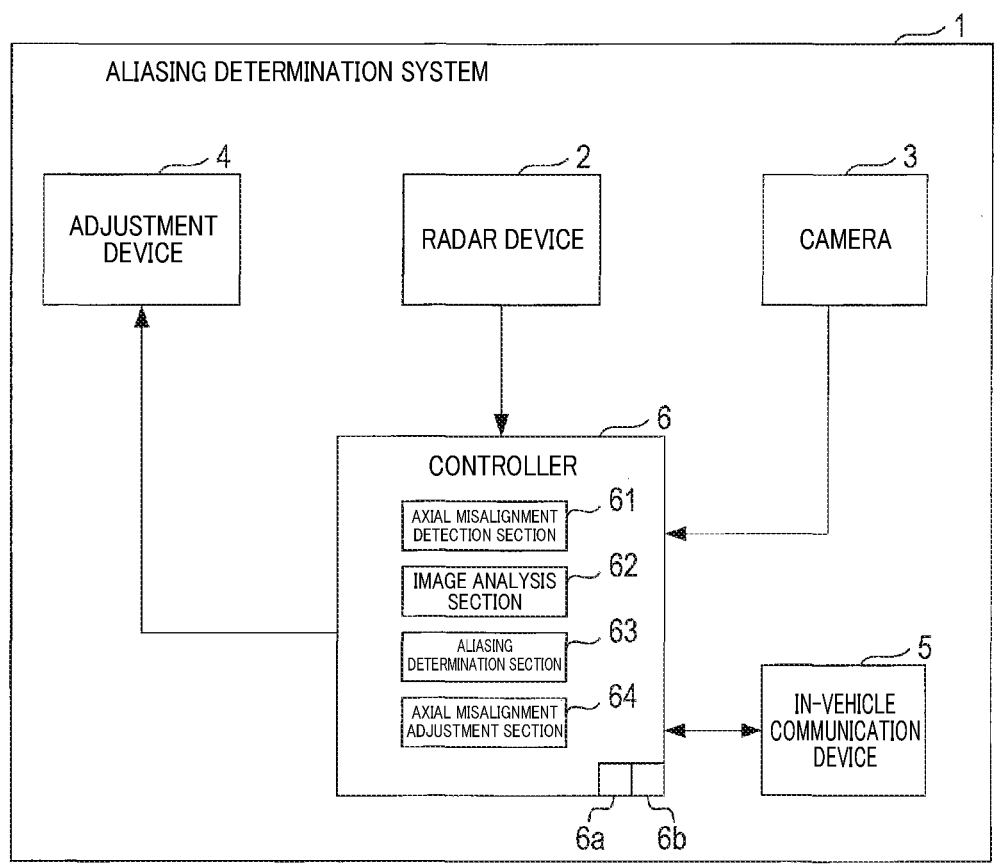
FIG. 1 is a block diagram illustrating the configuration of an aliasing determination system.

Radar devices that receive reflected waves from a target object that has reflected radio waves, through an array antenna, and detect the direction of the target object using the phase difference $\Delta\theta$ generated between received signals from antennas are unable to distinguish between $\Delta\theta=\theta_0$ and $\Delta\theta=\theta_0\pm 2n\pi$ due to phase periodicity. Note that, $|\theta_0|<\pi$, $n=1, 2, \ldots$.

For example, when the target object is present in an azimuth region (hereinafter, referred to as a measurement angle range) corresponding to a range where the phase difference $\Delta\theta$ is represented as $-\pi<\Delta\theta\leq+\pi$ [rad], the direction is correctly detected. Unfortunately, when the target object is present out of the measurement angle range, or in the range where the phase difference $\Delta\theta$ is represented as $\Delta\theta\leq-\pi$ or $\Delta\theta>\pi$, the direction of the target object is erroneously detected as being in the measurement angle range due to what is called phase aliasing.

JP 2018-91785 A (published unexamined patent application) proposes a technique of obtaining a correct direction by using a technique of tracking an object depending on the presence/absence of historical connection, extracting an observed value with the historical connection to a predicted value that has been performed aliasing correction when the predicted value is out of the measurement angle range, and performing aliasing correction on the extracted observed value. Note that the predicted value refers to a value that is predicted from the detection result of the previous processing cycle, and the observed value is a value that is actually observed by the present processing cycle.

However, as a result of detailed studies by the inventors, the following issue was found with the conventional technique disclosed in JP 2018-91785 A. That is, when the radar device has axial misalignment, an object that would be located within a correct measurement angle range in a case without the presence of axial misalignment is undesirably detected as being in an aliasing direction. Unfortunately, when such an object is detected suddenly without a tracking history, the aliasing direction is kept detected as the correct direction of the object and fails to be corrected.

One phase of the present disclosure is to provide a technique of correctly detecting the direction of a target object detected without a tracking history even when the radar device has axial misalignment.

One aspect of the present disclosure includes an aliasing determination device, which includes an information acquisition section, an axial misalignment acquisition section, an aliasing calculation section, and an instantaneous determination section.

The information acquisition section repeatedly acquires observation point information including an observation direction, which is an observed value of a designated direction. The designated direction corresponding to the observation direction is at least one of a horizontal direction and a vertical direction. The axial misalignment acquisition section obtains an orientation of the radar device when the radar device is mounted at a reference position as a reference mounting direction and an actual orientation of the radar device as an actual mounting direction and acquires an axial misalignment amount of the actual mounting direction with respect to the reference mounting direction toward the designated direction. The aliasing calculation section calculates an aliasing direction, which is a direction estimated when there is phase aliasing in the observation direction included in the observation point information. The instantaneous determination section determines, as an actual direction, one of the observation direction and the aliasing direction corresponding to the observation direction that is closer to the reference mounting direction, which is estimated from the axial misalignment amount and the actual mounting direction.

With this configuration, the presence/absence of phase aliasing is determined by setting one of the observation direction and the aliasing direction that is closer to the reference mounting direction as the correct direction. Thus, by determining the presence/absence of phase aliasing without using the history of the observation direction, the accuracy is improved in detecting the direction of observation points that are present in the correct detection region with the reference mounting direction at the center.

An embodiment of the present disclosure will hereafter be described with reference to the drawings.

1. First Embodiment

[1-1. Configuration]

An aliasing determination system 1 according to the present embodiment is mounted on a vehicle and includes a radar device 2, a camera 3, an adjustment device 4, an in-vehicle communication device 5, and a controller 6 as shown in FIG. 1.

Figure 2:
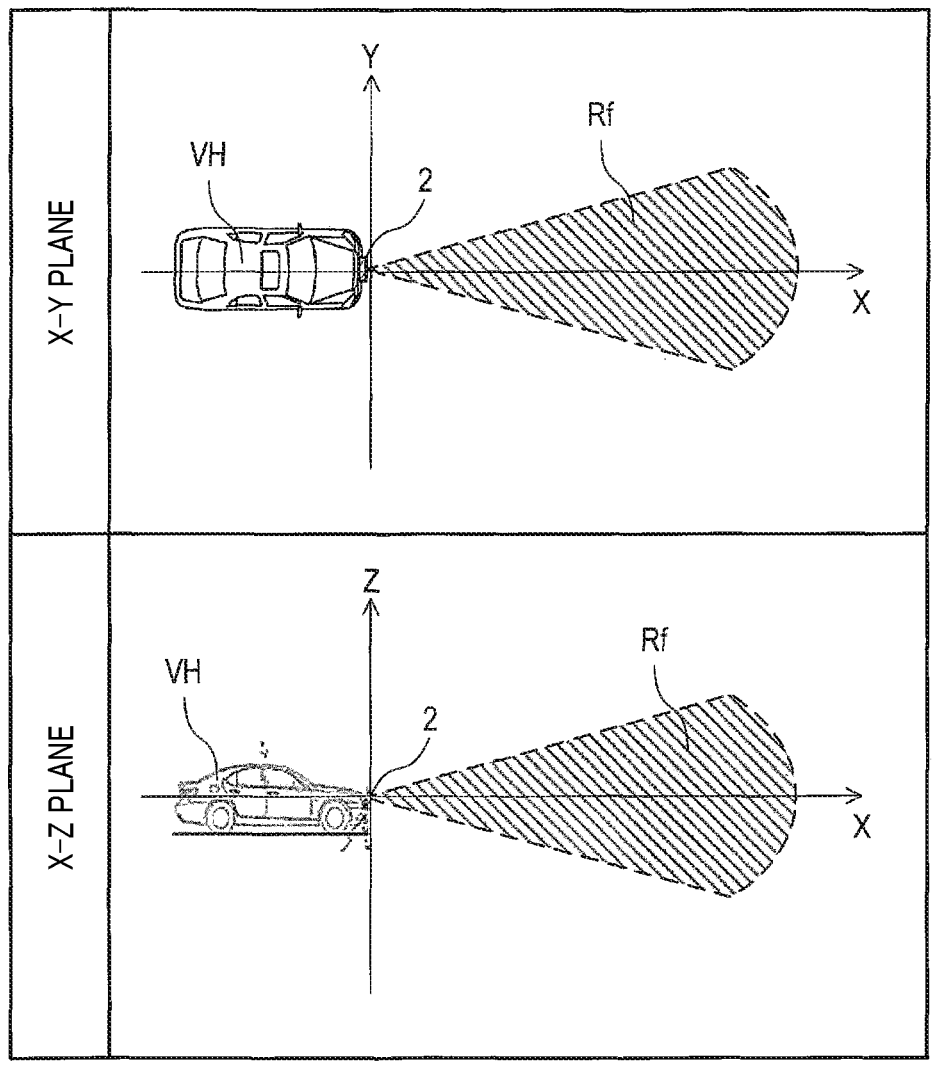
FIG. 2 is an explanatory diagram illustrating an object detection region Rf.

The radar device 2 is located at the front end section of a vehicle VH on which the aliasing determination system 1 is mounted as shown in FIG. 2. The radar device 2 detects an object that is present in a detection region Rf in front of the vehicle VH by transmitting radio waves in front of the vehicle VH and receiving reflected radio waves.

The radar device 2 employs, for example, a frequency-modulated continuous-wave (FMCW) system. The radar device 2 alternately transmits radio waves in an upsweep segment and a downsweep segment at a predetermined modulation period and receives reflected radio waves. The radar device 2 detects, at every modulation period, a received power P of a received radio wave, a distance R to a point on an object that has reflected the radio wave (hereinafter, referred to as an observation point), a relative velocity Vr with respect to the observation point, and a horizontal azimuth φx of the observation point. Furthermore, the radar device 2 outputs observation point information indicating the detected received power P, the distance R, the relative velocity Vr, and the horizontal azimuth φx to the controller 6. Note that the horizontal azimuth φx of the observation point is detected using the phase difference between the received signals received by multiple receiving antennas of the radar device 2. The region of the azimuth where phase aliasing does not occur in the radar device 2 is referred to as a measurement angle range, and the detection region Rf is set to include an angular range that is narrower than the measurement angle range.

The camera 3 is mounted, for example, on the front end section of the vehicle VH or in the vicinity of the rearview mirror and continuously captures images of the situation in front of the vehicle VH including the detection region Rf.

The adjustment device 4 includes a motor and a gear mounted on the radar device 2. The adjustment device 4 adjusts the mounting angle of the radar device 2 by rotating the motor in accordance with a driving signal output from the controller 6. That is, when the rotational force of the motor is transmitted to the gear, the radar device 2 is rotated about an axis extending along the height of the vehicle VH.

The in-vehicle communication device 5 communicates through a vehicle-mounted local area network (LAN), which connects a variety of devices mounted on the vehicle with each other. The in-vehicle communication device 5 acquires detection signals from a variety of sensors that detect the behavior of the vehicle through the vehicle-mounted LAN. The behavior of the vehicle to be detected includes at least a velocity Vs and a steering angle θ.

The controller 6 includes a microcomputer that has a CPU 6a and, for example, a semiconductor memory (hereinafter, referred to as a memory) 6b, such as a RAM or a ROM. The functions of the controller 6 are achieved by executing programs stored in a non-transitory tangible storage medium by the CPU 6a. In this example, the memory 6b corresponds to the non-transitory tangible storage medium that stores the programs. Executing the programs executes methods corresponding to the programs.

The functions achieved by executing the programs by the controller 6 include at least an axial misalignment detection section 61, an image analysis section 62, an aliasing determination section 63, and an axial misalignment adjustment section 64.

Figure 4:
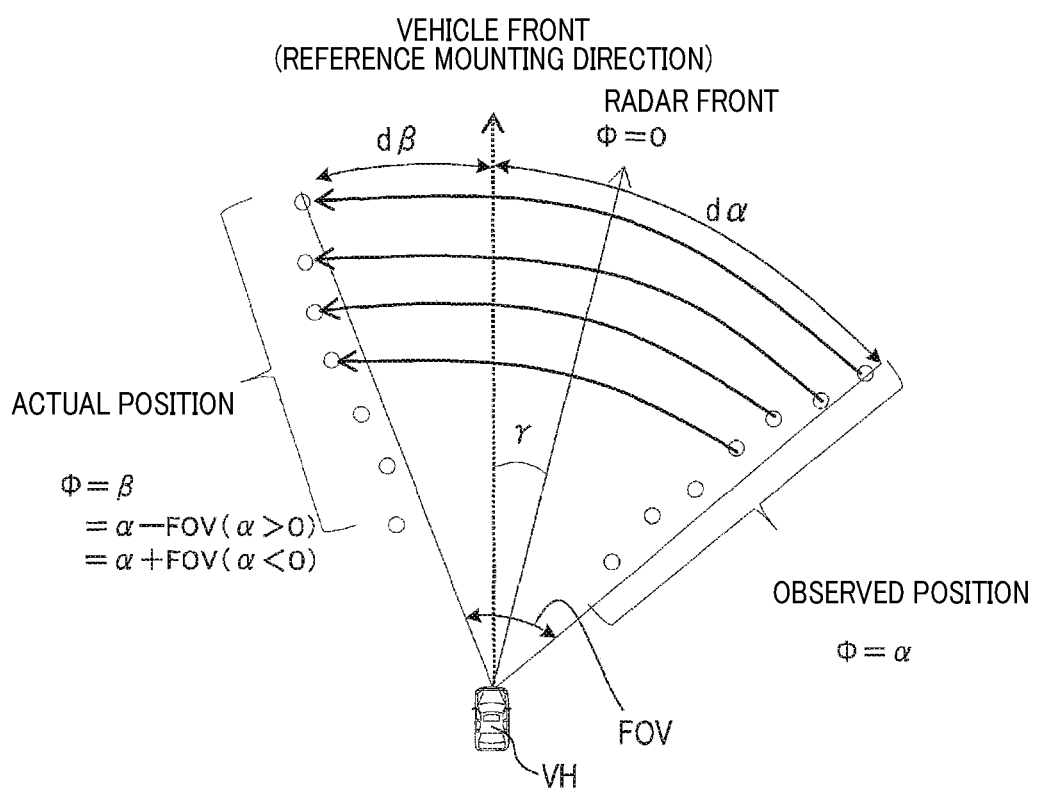
FIG. 4 is an explanatory diagram illustrating parameters used in the aliasing determination process for the horizontal direction.

The axial misalignment detection section 61 detects an axial misalignment amount γ of the actual mounting direction with respect to a reference mounting direction in a designated direction based on the information of the observation point detected by the radar device 2. The reference mounting direction is the orientation of the radar device 2 when the radar device 2 is mounted at a reference position, which is the correct position for the radar device 2 to be mounted. The actual mounting direction is the actual orientation of the radar device 2 mounted on the vehicle. In this specification, the front direction of the radar device 2 is referred to as the orientation of the radar device 2, and the front direction of the vehicle is referred to as the reference mounting direction. That is, the axial misalignment amount γ refers to the angle between the front direction of the radar device 2 and the front direction of the vehicle used as the reference as shown in FIG. 4.

The image analysis section 62 detects the situation in the detection region Rf by analyzing the front image obtained by the camera 3. Specifically, the analysis result includes at least the information such as the position of lanes drawn on the road and the presence/absence of a vehicle in front that is traveling on the same lane as a subject vehicle.

The aliasing determination section 63 determines whether the direction information of the observation point detected by the radar device 2 is information in which phase aliasing has occurred and corrects the direction information. The details thereof will be described below. Note that the corrected direction information will also be used for processes performed by the axial misalignment detection section 61.

The axial misalignment adjustment section 64 adjusts the mounting angle of the radar device 2 by driving the adjustment device 4 in accordance with the detection result of the axial misalignment detection section 61.

Note that the detailed descriptions of the axial misalignment detection section 61, the image analysis section 62, and the axial misalignment adjustment section 64 are omitted here.

The memory 6b stores at least information indicating the directivity of the antennas of the radar device 2, that is, information that correlates a direction and a gain in that direction (hereinafter, referred to as directivity information).

[1-2. Process]

Figure 3:
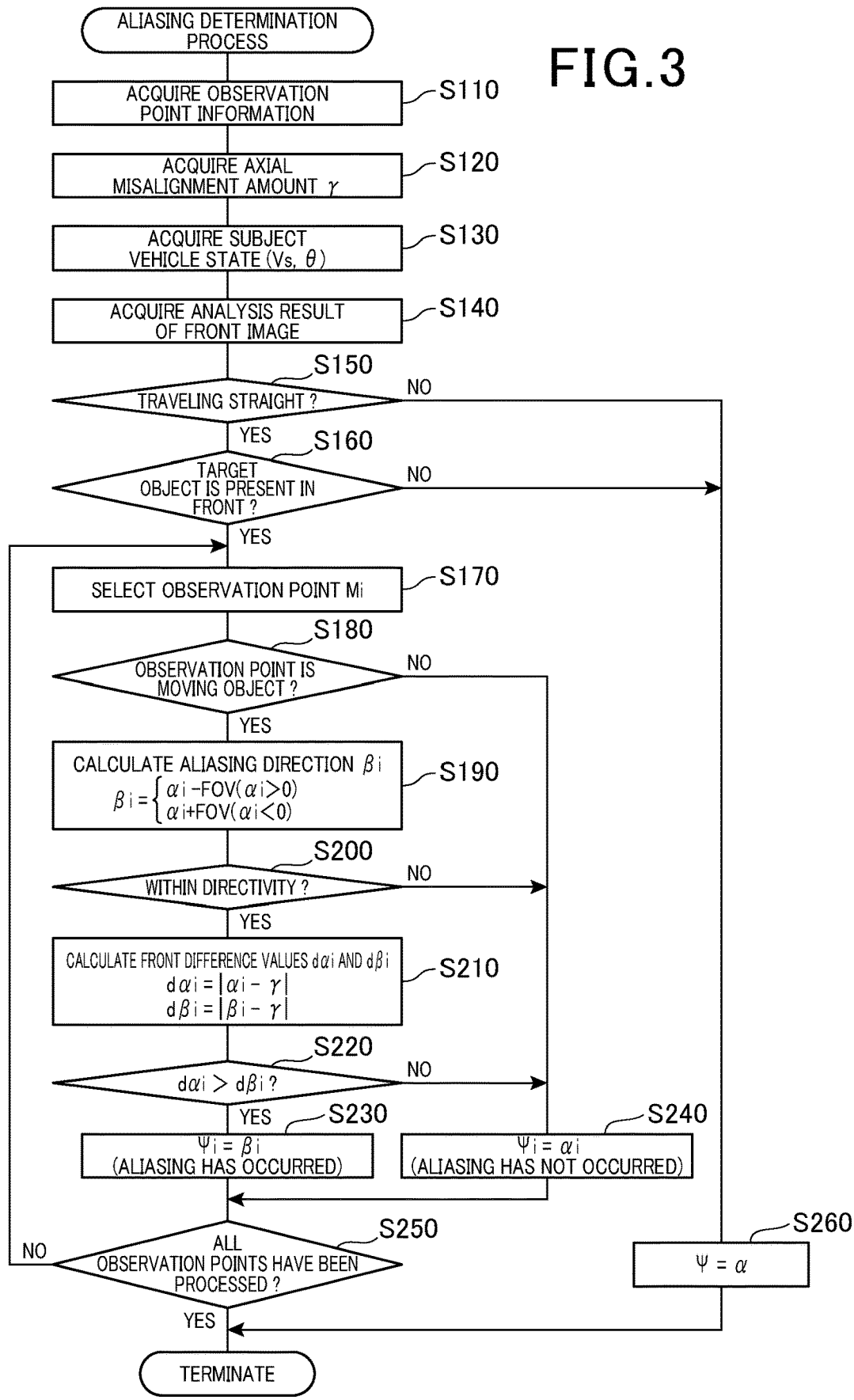
FIG. 3 is a flowchart of an aliasing determination process according to a first embodiment.

An aliasing determination process executed by the controller 6 to achieve the function of the aliasing determination section 63 will be described using the flowchart shown in FIG. 3.

The aliasing determination process is repeatedly executed upon starting of the aliasing determination system 1.

At step S110, the controller 6 acquires observation point information from the radar device 2.

At subsequent step S120, the controller 6 acquires the axial misalignment amount γ, which is the processing result of the axial misalignment angle calculation process.

At subsequent step S130, the controller 6 acquires the state of the subject vehicle through the in-vehicle communication device 5. The state of the subject vehicle to be acquired includes at least the subject vehicle velocity Vs and the steering angle θ.

At subsequent step S140, the controller 6 acquires the analysis result of the image analysis process. The analysis result to be acquired includes at least the information of a target object that is present in the same lane as the subject vehicle.

At subsequent step S150, the controller 6 determines whether the subject vehicle is traveling straight. In response to the controller 6 determining that the subject vehicle is traveling straight, the process proceeds to step S160. In response to the controller 6 determining that the subject vehicle is not traveling straight, the process proceeds to step S260. Note that the determination of whether the subject vehicle is traveling straight may be made based on, for example, the steering angle θ included in the subject vehicle state acquired at step S130. In a case in which the analysis result acquired at step S140 includes the shape of white lines, the determination may be made based on the shape of the white lines.

Figure 5:
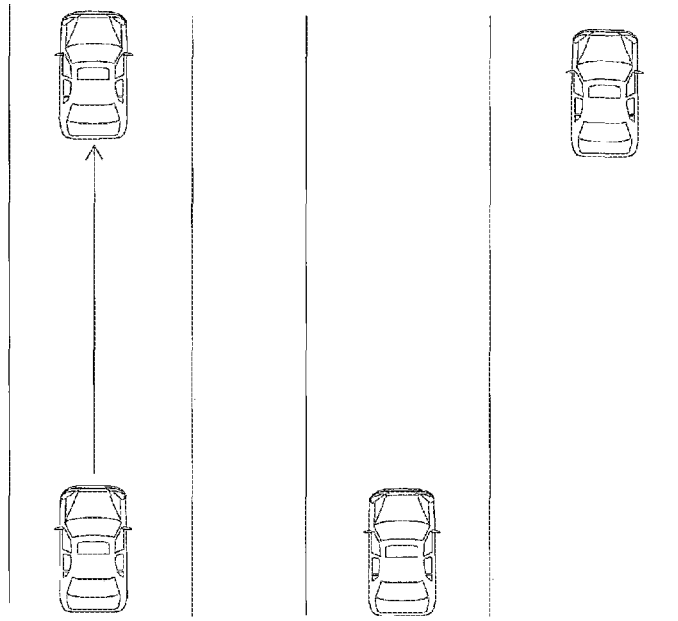
FIG. 5 is an explanatory diagram illustrating the determination of whether a target object is present in front in the aliasing determination process for the horizontal direction.

At step S160, the controller 6 determines whether there is a target object in front. In response to the controller 6 determining that there is a target object, the process proceeds to step S170. In response to the controller 6 determining that there is no target object, the process proceeds to step S260. Note that the determination of whether there is a target object in front may be made, for example, based on the analysis result of the front image acquired at step S140. That is, as shown in FIG. 5, the determination may be made based on whether there is a vehicle ahead on the same lane as the subject vehicle, using the analysis result.

At step S170, the controller 6 selects one of the pieces of observation point information acquired at step S110. The observation point corresponding to the observation point information will be identified by Mi, and the direction of the observation point included in the observation point information (hereinafter, referred to as an observation direction) will be referred to as αi. The observation direction αi is represented by an angle that becomes positive clockwise from the front direction and becomes negative counterclockwise from the front direction with the front direction of the radar device 2 used as a reference (that is 0°).

At subsequent step S180, the controller 6 determines whether the observation point Mi selected at S170 is associated with a moving object. In response to the controller 6 determining that the observation point Mi is associated with a moving object, the process proceeds to step S190. In response to the controller 6 determining that the observation point Mi is not associated with a moving object, the process proceeds to step S240. Note that, when the absolute value of the difference between the relative velocity (hereinafter, referred to as an observation velocity) Vr indicated by the observation point information of the selected observation point Mi and the subject vehicle velocity Vs acquired at step S130 is greater than or equal to a threshold value, it is determined that the observation point Mi is a moving object.

At step S190, when it is assumed that the phase aliasing is occurring in the observation direction αi, the controller 6 calculates an aliasing direction βi, which is the direction in which the observation point Mi is presumed to actually be present. Specifically, the aliasing direction βi is calculated using formulas (1) and (2) where FOV represents the azimuth width of the entire measurement angle range of the radar device 2 as shown in FIG. 4.

$$\beta i = \alpha i - FOV \text{ (where } \alpha i \geq 0) \tag{1}$$

$$\beta i = \alpha i + FOV \text{ (where } \alpha i < 0) \tag{2}$$

Figure 6:
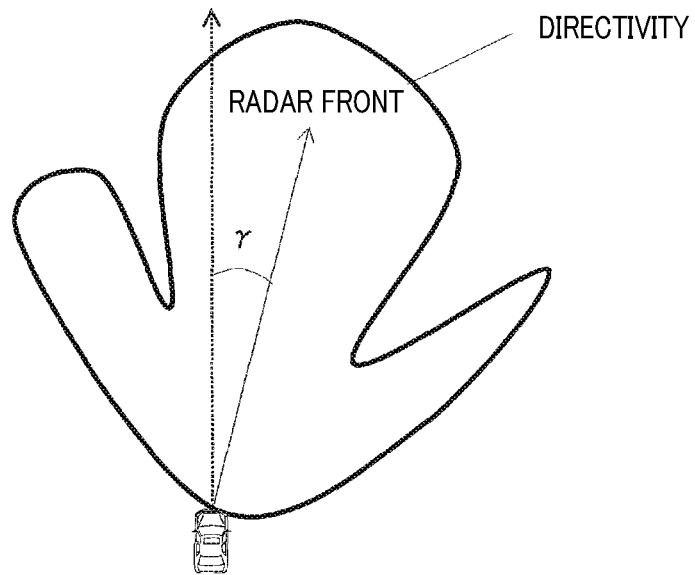
FIG. 6 is an explanatory diagram illustrating directivity and an axial misalignment amount of the radar device in the horizontal direction.

At subsequent step S200, the controller 6 determines whether the aliasing direction βi is included in the range in which the gain is greater than or equal to a threshold value (hereinafter, referred to as a directivity range) based on a radiation pattern representing the directivity of the radar device 2. When it is determined that the aliasing direction βi is included in the directivity range, the controller 6 considers that there is a possibility that phase aliasing is occurring and moves the process to step S210. When it is determined that the aliasing direction βi is out of the directivity range, the controller 6 considers that the possibility that the phase aliasing is occurring is low and moves the process to step S240. For example, in a case in which the radiation pattern includes a main lobe and side lobes as shown in FIG. 6, if the aliasing direction βi is within either of the side lobes, the actual observation point Mi may be present in the aliasing direction βi. If the aliasing direction βi is in a direction between the main lobe and either of the side lobes, there is a low possibility that the actual observation point Mi is present in the aliasing direction βi, and thus it is determined that the observation direction αi is the correct direction.

At step S210, the controller 6 calculates front difference values dαi and dβi, which are the difference between the observation direction αi and the front direction of the vehicle (that is, the reference mounting direction) and the difference between the aliasing direction βi and the front direction of the vehicle (that is, the reference mounting direction), using the formulas (3) and (4). That is, this step performs a process of converting αi and βi represented by the angle formed with respect to the front direction of the radar device 2 to absolute values of the angle formed with respect to the front direction of the vehicle using the axial misalignment amount γ as shown in FIG. 4. In FIG. 4, γ is a negative value.

$$d\alpha i = |\alpha i - \gamma| \qquad (3)$$

$$d\beta i = |\beta i - \gamma| \qquad (4)$$

At subsequent step S220, the controller 6 determines which of the observation direction αi and the aliasing direction βi is closer to the front direction. Specifically, it is determined whether dαi is greater than dβi using the difference values dαi and dβi calculated at step S210. In response to the controller 6 determining that dαi is greater than dβi, that is, the aliasing direction βi is closer to the front direction of the vehicle than the observation direction αi is, the process proceeds to step S230. In response to the controller 6 determining that dαi is smaller than or equal to dβi, that is, the observation direction αi is closer to the front direction of the vehicle than the aliasing direction βi is, the process proceeds to step S240.

At step S230, the controller 6 determines that phase aliasing has occurred in the observation direction αi of the observation point Mi, sets the aliasing direction βi as a final direction ψi of the observation point Mi, and then advances the process to step S250.

At step S240, the controller 6 determines that phase aliasing has not occurred in the observation direction αi of the observation point Mi, sets the observation direction αi as the final direction ψi of the observation point Mi, and then advances the process to step S250.

At step S250, the controller 6 determines whether the processes of S170 to S240 have been performed for all the pieces of observation point information acquired at step S110. In response to the controller 6 determining that there is unprocessed observation point information, the process returns to step S170, and in response to the controller 6 determining that all the pieces of observation point information have been processed, the aliasing determination process is terminated.

At step S260, the controller 6 sets the observation direction α as the final direction ψ of the observation point M without determining the presence/absence of phase aliasing for all the pieces of observation point information acquired at step S110 and terminates the aliasing determination process.

The final direction ψ of the observation point M is supplied to the subsequent process together with the axial misalignment amount γ.

The final direction ψ, specifically, the final directions ψ set at steps S230 and S240 are also used in the axial misalignment amount calculation process.

Note that step S110 corresponds to the information acquisition section, step S120 corresponds to the axial misalignment acquisition section, step S150 corresponds to a traveling determination section, step S160 corresponds to a target object determination section, step S180 corresponds to a movement determination section, and step S190 corresponds to the aliasing calculation section. Furthermore, step S200 corresponds to a directivity determination section, steps S210 and S220 correspond to the instantaneous determination section, and steps S230 and S240 correspond to a process execution section. The controller 6 that executes the aliasing determination process corresponds to the aliasing determination device.

[1-3. Advantages]

The first embodiment described above has the following advantages.

Figure 7:
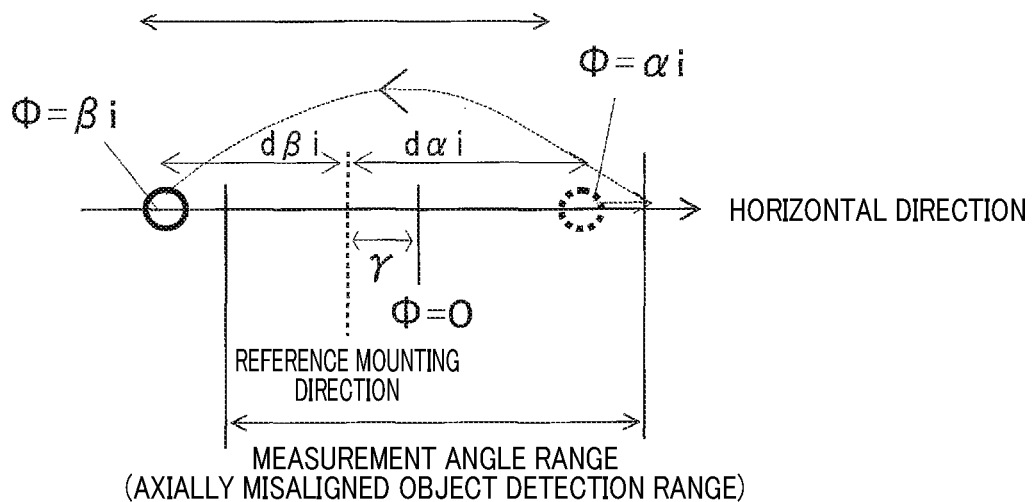
FIG. 7 is an explanatory diagram showing, for example, the relationship between the measurement angle range with respect to an observation direction and an aliasing direction in the aliasing determination process for the horizontal direction.

(1a) The aliasing determination system 1 performs a determination of the presence/absence of phase aliasing in the observation direction αi when the subject vehicle is traveling straight and a target object is present in front of the subject vehicle. That is, as shown in FIG. 7, using the fact that a target object is present in front of the subject vehicle, the presence/absence of phase aliasing is determined by setting, as the correct direction, one of the observation direction αi and the aliasing direction βi that is closer to the front direction of the vehicle. Thus, the aliasing determination system 1 determines the presence/absence of phase aliasing without using the observation history of the direction of the observation point Mi and obtains the correct direction of the observation point Mi.

(1b) The aliasing determination system 1 uses the radiation pattern indicating the directivity of the antennas of the radar device 2, determines that there is a possibility of occurrence of phase aliasing when the aliasing direction βi is present within the directivity range in which a gain that is greater than or equal to the threshold value is present in the radiation pattern, and performs a determination of the presence/absence of phase aliasing. That is, since the received power of a reflected wave from a target object located out of the directivity range is very small and is unlikely to be detected, it is determined that there is no phase aliasing when the aliasing direction βi is out of the directivity range.

(1c) The aliasing determination system 1 performs a determination of the presence/absence of phase aliasing when the observation point Mi is associated with a moving object. That is, since stationary objects such as roadside objects are probably not located in front of the subject vehicle, excluding stationary objects improves the accuracy of the aliasing determination.

Figure 8:
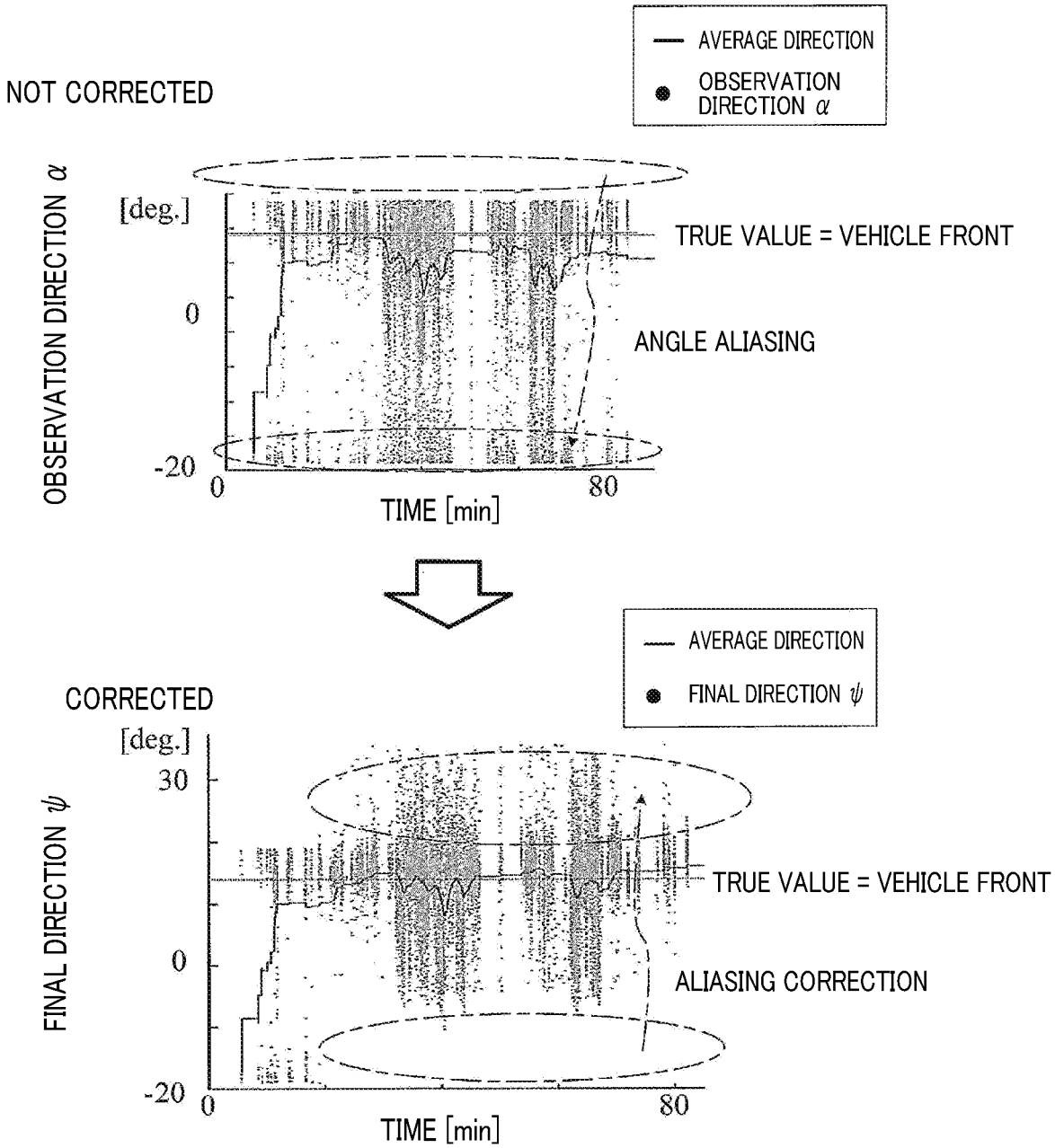
FIG. 8 is an explanatory diagram showing the result of calculating the axial misalignment amount from the observation direction for each of the case in which correction of the observation direction based on the determination result of the aliasing determination is not performed and the case in which the correction of the observation direction is performed.

(1d) Since the aliasing determination system 1 uses the final direction ψ obtained through the aliasing determination process in the axial misalignment amount calculation process, the accuracy in calculating the axial misalignment amount γ is improved. For example, a case in which the axial misalignment has occurred in the positive direction by an angle φ is considered. In this case, when the observation point direction αi is used unchanged to estimate the axial misalignment amount γ without taking phase aliasing into consideration, an observation point Mi that is supposed to be detected in the positive direction is detected in the negative direction due to phase aliasing as shown in the top section of FIG. 8. When the axial misalignment amount γ is estimated using such an observation point Mi, an axial misalignment amount γ is obtained that is shifted toward the negative side from a true value indicating the front direction of the vehicle. In contrast, by using the aliasing direction βi as the final direction ψi of the observation point Mi that is determined to have phase aliasing by the aliasing determination, the final direction ψi is distributed substantially equally on the positive side and the negative side of the true value as shown in the lower section of FIG. 8. As a result, an axial misalignment amount γ closer to the true value is obtained.

[1-4. Modification]

Figure 9:
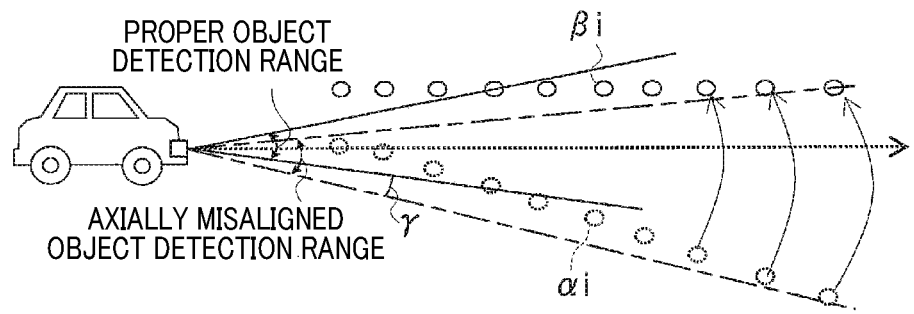
FIG. 9 is an explanatory diagram illustrating parameters used in the aliasing determination process for the vertical direction.
Figure 10:
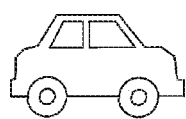
FIG. 10 is an explanatory diagram illustrating the determination of whether a target object is present in front in the aliasing determination process for the horizontal direction.
Figure 10:
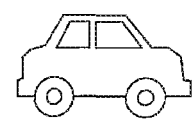
Figure 10:
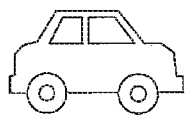
Figure 10:
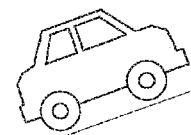
Figure 11:
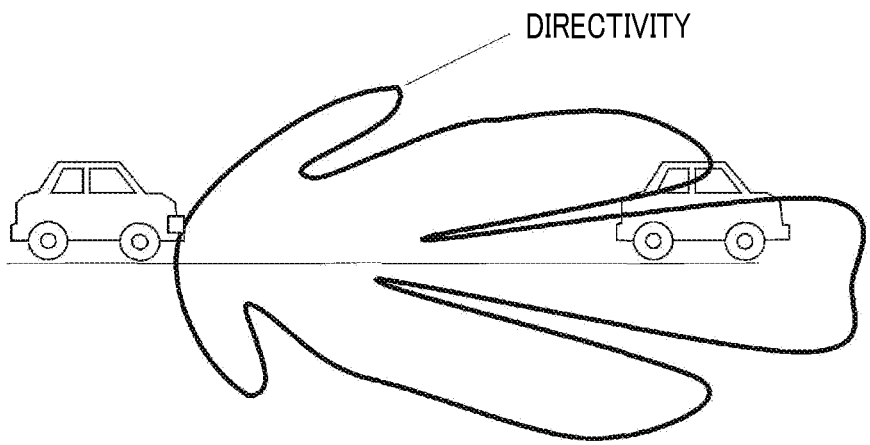
FIG. 11 is an explanatory diagram illustrating the directivity of the radar device in the vertical direction.

Although the above-described embodiment shows an example of making a determination of the presence/absence of phase aliasing in the horizontal direction, the determination of the presence/absence of phase aliasing may be made in the vertical direction as shown in FIG. 9. In this case, the determination of whether there is a target object in front at step S160 is made based on whether there is a target object at the same height as the subject vehicle in the vertical direction as shown in FIG. 10. The directivity in the vertical direction as shown in FIG. 11 is also taken into consideration to perform a determination.

Figure 12:
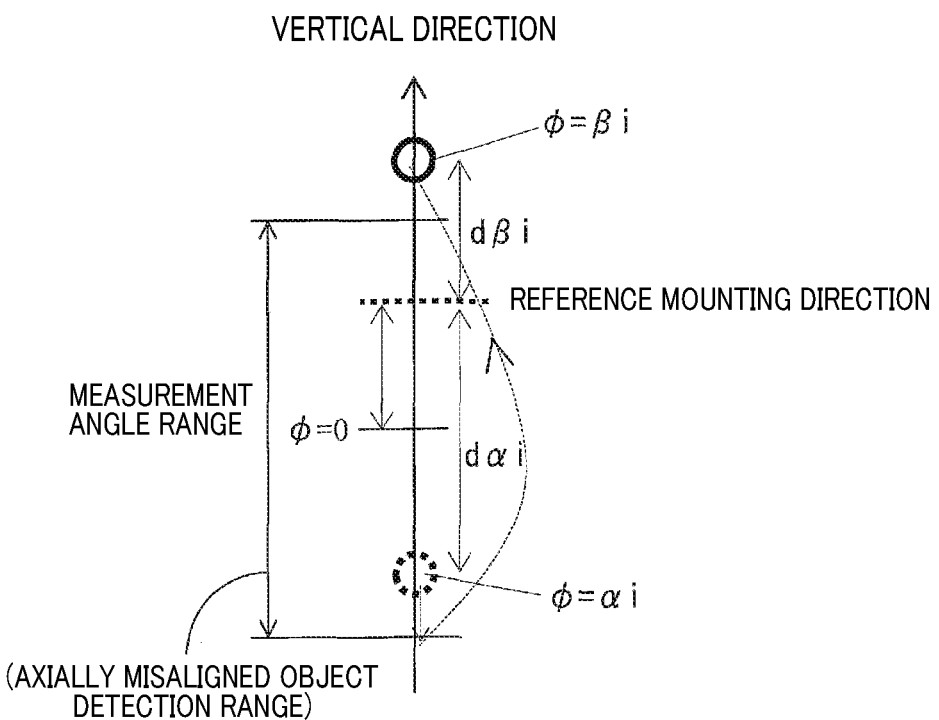
FIG. 12 is an explanatory diagram showing, for example, the relationship between the measurement angle range with respect to the observation direction and the aliasing direction in the aliasing determination process for the vertical direction.

In this case, like the horizontal direction, as shown in FIG. 12, using the fact that a target object is present in front of the subject vehicle, the presence/absence of phase aliasing is determined by setting, as the correct direction, one of the observation direction $\alpha i$ and the aliasing direction $\beta i$ that is closer to the front direction of the vehicle. Thus, the aliasing determination system 1 determines the presence/absence of phase aliasing without using the observation history of the direction of the observation point Mi and obtains the correct vertical direction of the observation point Mi. Furthermore, the accuracy in detecting the axial misalignment amount $\gamma$ in the vertical direction of the radar device 2 is improved.

2. Second Embodiment

[2-1. Differences from First Embodiment]

Since the basic structure of the second embodiment is the same as that of the first embodiment, the differences will be discussed below. The reference numerals that are the same as those in the first embodiment refer to the same components, and the preceding description will be referred to.

The second embodiment differs from the first embodiment in that the history information is used in the aliasing determination process.

[2-2. Process]

Figure 13:
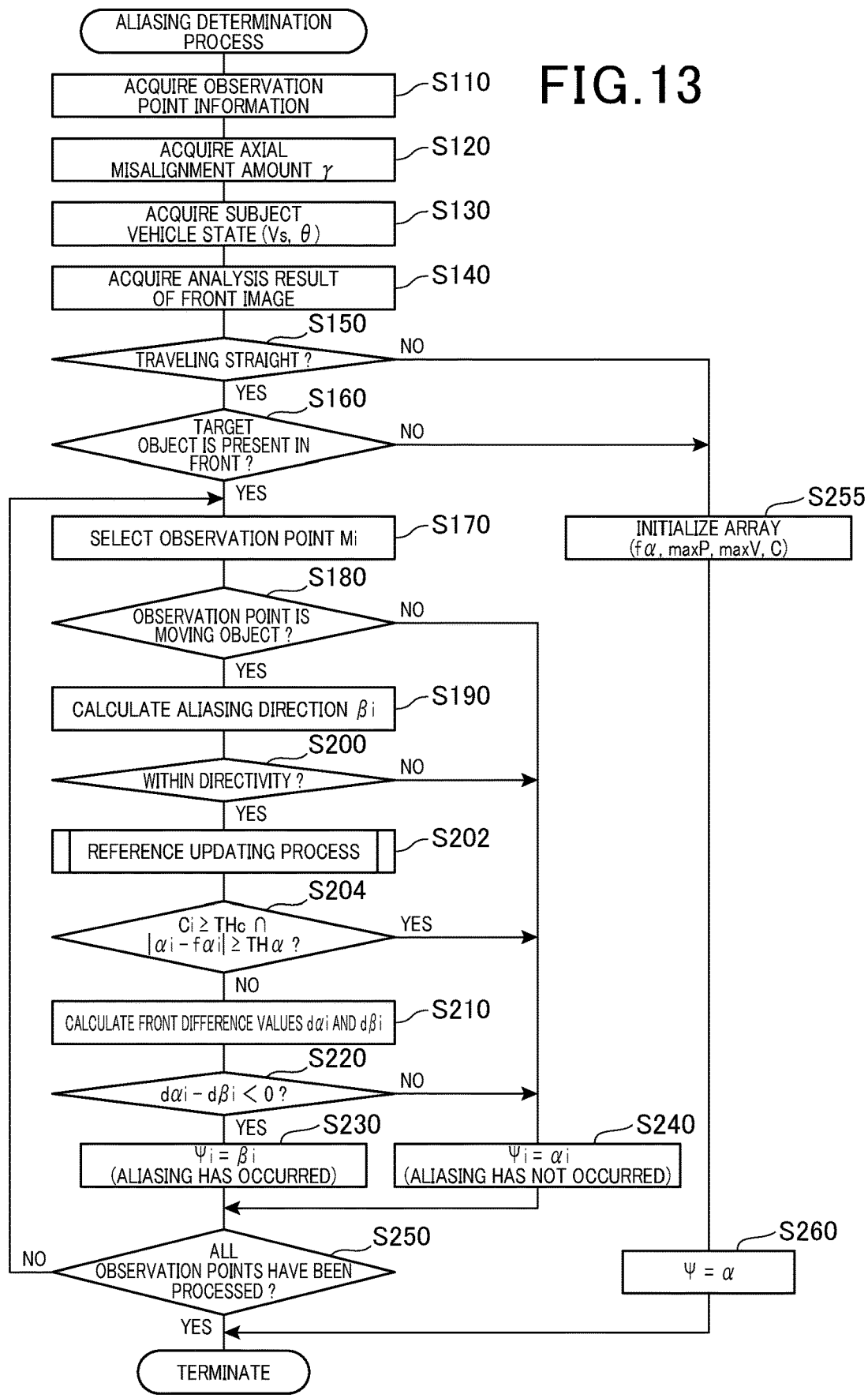
FIG. 13 is a flowchart of an aliasing determination process according to a second embodiment.

Next, the aliasing determination process executed by the controller 6 of the second embodiment instead of the aliasing determination process of the first embodiment shown in FIG. 3 will be described using the flowchart shown in FIG. 13. Note that, since the second embodiment is the same as the first embodiment except that steps S202, S204, and S255 are added, only the differences will be described.

When a target object is present in the vicinity of the boundary of the detection region of the radar device 2, the observation point Mi based on the same target object may be detected on both sides of the boundary of the detection region at every processing cycle due to phase aliasing. The second embodiment also addresses such a case.

At step S202, which is the step performed when the decision outcome of step S200 is positive, the controller 6 executes a reference updating process.

Figure 14:
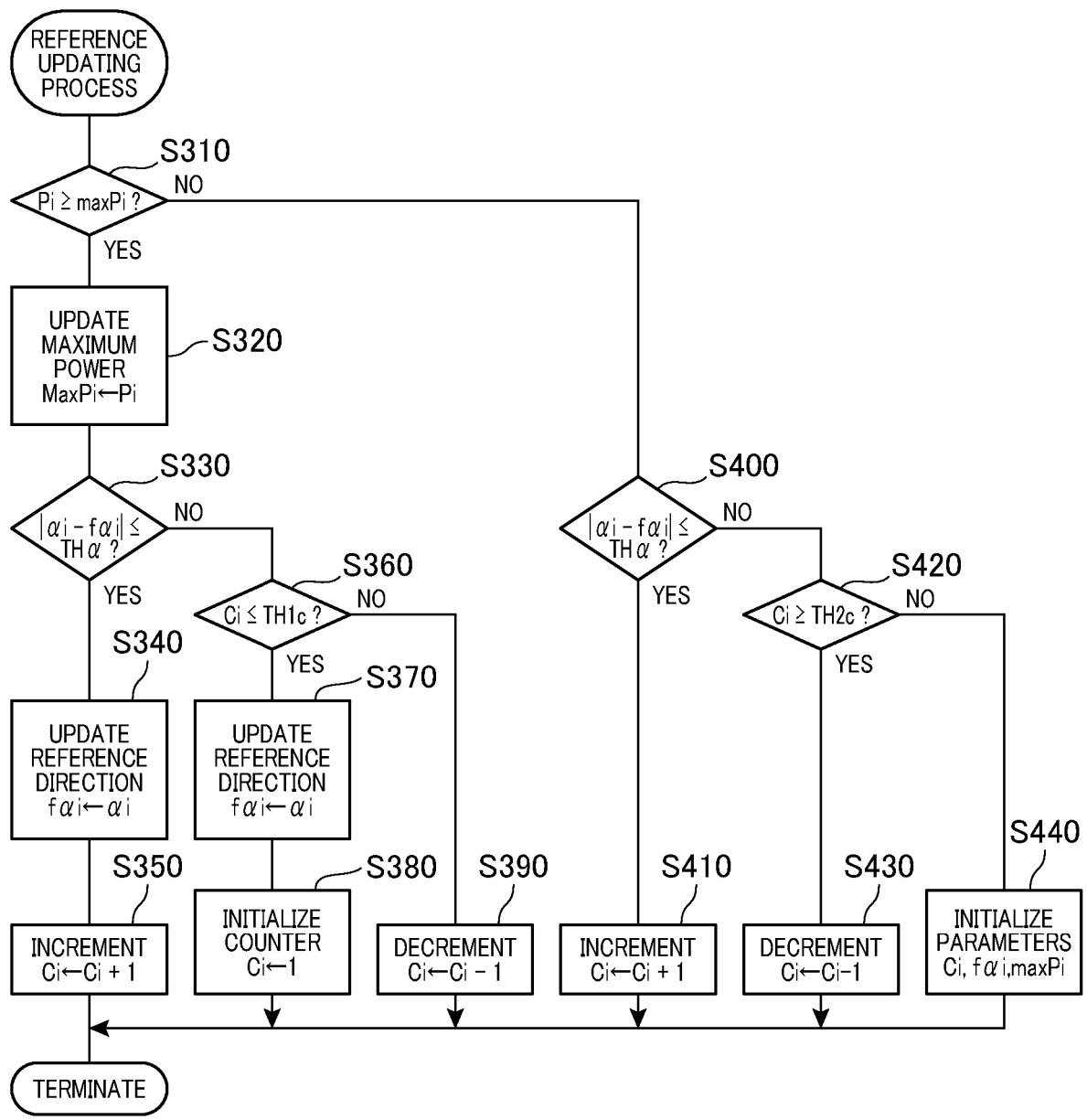
FIG. 14 is a flowchart of a reference updating process.

The details of the reference updating process will be described using the flowchart of FIG. 14.

At step S310, the controller 6 determines whether the received power Pi of the selected observation point Mi is greater than or equal to a maximum power maxPi stored at that point in time. In response to the controller 6 determining that Pi is greater than or equal to maxPi, the process proceeds to step S320, and in response to the controller 6 determining that Pi is smaller than maxPi, the process proceeds to step S400.

At step S320, the controller 6 updates the maximum power maxPi using the received power Pi.

At subsequent step S330, the controller 6 determines whether the observation direction $\alpha i$ and the reference direction $f\alpha i$ can be considered to be in the same direction. Specifically, when the absolute value of the difference between $\alpha i$ and $f\alpha i$ is less than or equal to a threshold value $TH\alpha$, $\alpha i$ and $f\alpha i$ can be considered to be in the same direction. In response to the controller 6 determining that $\alpha i$ and $f\alpha i$ are in the same direction, the process proceeds to step S340. In response to the controller 6 determining that $\alpha i$ and $f\alpha i$ are not in the same direction, the process proceeds to step S360.

At step S340, the controller 6 updates the reference direction $f\alpha i$ using the observation direction $\alpha i$.

At subsequent step S350, the controller 6 increments a count value Ci and terminates the process.

At step S360, the controller 6 determines whether the count value Ci is less than or equal to a first threshold value TH$1c$. When Ci is less than or equal to TH$1c$, the process proceeds to step S370, and when Ci is greater than TH$1c$, the process proceeds to step S390. TH$1c$ is set to a relatively small value such as about two to five.

At step S370, the controller 6 updates the reference direction $f\alpha i$ using the observation direction $\alpha i$.

At subsequent step S380, the controller 6 initializes the count value Ci to 1 and terminates the process.

At step S390, the controller 6 decrements the count value Ci and terminates the process.

At step S400, the controller 6 determines whether the observation direction $\alpha i$ and the reference direction $f\alpha i$ can be considered to be in the same direction like at step S330. In response to the controller 6 determining that $\alpha i$ and $f\alpha i$ are in the same direction, the process proceeds to step S410. In response to the controller 6 determining that $\alpha i$ and $f\alpha i$ are not in the same direction, the process proceeds to step S420.

At step S410, the controller 6 increments the count value Ci and terminates the process.

At step S420, the controller 6 determines whether the count value Ci is greater than or equal to a second threshold value TH$2c$. When Ci is greater than or equal to TH$2c$, the process proceeds to step S430, and when Ci is less than TH$2c$, the process proceeds to step S440. The second threshold value TH$2c$ may be the same as or different from the first threshold value TH$1c$.

At step S430, the controller 6 decrements the count value Ci and terminates the process.

At step S440, the controller 6 initializes the parameters Ci, $f\alpha i$, and maxPi, which are used in the reference updating process, and terminates the process.

That is, when the received power Pi of the observation point Mi is greater than or equal to the maximum power maxPi, the reference direction $f\alpha i$ and the count value Ci are both changed. Specifically, at steps S330 to S390, when the observation direction $\alpha i$ of the observation point Mi at which the received power Pi is the maximum can be considered the same as the present reference direction $f\alpha i$, the reference direction $f\alpha i$ is updated using the observation direction $\alpha i$, and the count value Ci is incremented. In a case in which the observation direction $\alpha i$ differs from the present reference direction $f\alpha i$, when the count value Ci is greater than the first threshold value TH$c1$, the reference direction $f\alpha i$ is not updated, and the count value Ci is decremented. Furthermore, when the count value Ci is less than or equal to the first threshold value TH$c1$, the reference direction $f\alpha i$ is updated, and the count value Ci is initialized to 1.

When the received power Pi of the observation point Mi is smaller than the maximum power maxPi, the reference direction $f\alpha i$ is not updated, and only the count value Ci is changed. Specifically, at steps S400 to S440, when the observation direction αi can be considered the same as the present reference direction fαi, the count value Ci is incremented. In a case in which the observation direction αi differs from the present reference direction fαi, when the count value Ci is greater than or equal to the second threshold value THc2, the count value Ci is decremented. The count value Ci that is smaller than the second threshold value TH2c refers to a decrease in the detection frequency of the observation point Mi in the direction in which the maximum power maxPi is detected. Thus, to redo the observation from the beginning, the parameters Ci, fαi, and maxPi are initialized. Specifically, for example, Ci is set to 1, and fαi and maxPi are set to 0.

In this way, the reference updating process processes the time series of observation points. As a result of the reference updating process, the direction in which the observation point Mi where the received power is the maximum is detected is set as the reference direction fαi, and the count value Ci is increased with an increase in the frequency of detecting the observation point Mi in the direction that is considered the same as the reference direction fαi.

Returning to FIG. 13, at step S204 subsequent to step S202, the controller 6 determines whether the count value Ci is greater than or equal to the threshold value THc and the observation direction αi can be considered the same as the reference direction fαi based on the processing result at step S202. Note that the threshold value THc is set to a value greater than or equal to 1 and smaller than the second threshold value TH2c. When the decision outcome is positive, the controller 6 moves the process to step S240. When the decision outcome is negative, the controller 6 moves the process to step S210.

That is, when the observation direction αi can be considered the same as the reference direction fαi, and the frequency of detecting the observation point Mi in the reference direction fαi is reasonably high, the observation direction αi is set as the final direction ψi on the assumption that there is no phase aliasing. In other cases, the determination of the presence/absence of aliasing is made using the front differences dαi and dβi.

At step S255, which is executed when the decision outcome of either step S150 or step S160 is negative, the controller 6 initializes all the parameters fαi, maxPi, and Ci, which are used in the reference updating process, and moves the process to step S260.

Note that step S202 corresponds to a reference direction setting section, and step S204 corresponds to a series determination section.

[2-3. Advantages]

The second embodiment described above further achieves the following advantages in addition to the advantage (1a) of the first embodiment described above.

(2a) In the second embodiment, since the determination of the presence/absence of aliasing is made using the received power Pi for a series of observation points Mi detected through multiple processing cycles, the accuracy in the determination is improved. That is, when phase aliasing is occurring, a target object is present in the boundary section of the detection region out of the center of the radiation pattern. The received power Pi of the observation point Mi detected when there is phase aliasing is smaller than the received power Pi detected at the same position when there is no phase aliasing. The use of this fact improves the determination accuracy.

[2-4. Modification]

According to the second embodiment, the count value Ci is increased and decreased using the received power Pi of the observation point Mi and the observation direction αi in the reference updating process. However, the relative velocity Vri of the observation point Mi may be used instead of the received power Pi. That is, since the relative velocity detected for the observation point Mi is a component of the velocity of the observation point Mi in the range direction, even when the observation point Mi is moving at a constant speed, the relative velocity takes the maximum value when the observation point Mi is located in front of the subject vehicle, and the relative velocity is decreased as the angle with respect to the front of the subject vehicle is increased. The relative velocity Vri of the observation point Mi detected when there is phase aliasing is smaller than the relative velocity Vri detected at the same position when there is no phase aliasing. The use of this fact improves the determination accuracy.

3. Other Embodiments

Although the embodiments of the present disclosure have been described, the present disclosure is not limited to the above embodiments and can be modified in various forms.

(3a) The above-described embodiments illustrate the radar device 2 that transmits radio waves in front of the vehicle VH. However, the transmission direction of the radio waves is not limited to the front of the vehicle VH. For example, the radar device 2 may transmit the radio waves toward at least one of the front, right front, left front, rear, right rear, left rear, right side, and left side of the vehicle VH in the first embodiment. In the case of the second embodiment, the radar device 2 may transmit the radio waves toward at least one of the front and rear of the vehicle VH.

(3b) The above-described embodiments illustrate the radar device 2 that uses the FMCW system. However, the radar system of the radar device 2 is not limited to the FMCW system. For example, a two-frequency continuous wave (CW) system, a fast-chirp modulation (FCM) system, or a pulse system may be used.

(3c) In the above-described embodiments, a constant axial misalignment amount γ based on the mounting state of the radar device 2 is calculated using the axial misalignment amount calculation process executed by the controller 6. However, the present disclosure is not limited to the above-described embodiments. For example, the axial misalignment amount γ may include a temporary inclination of the vehicle body caused by the pitch and roll of the vehicle body using, for example, an inclination sensor.

(3d) In the above-described embodiments, at steps S230 and S240, which correspond to the process execution section, a correction process of correcting the observation direction in accordance with the determination result of the presence/absence of phase aliasing is performed. However, the present disclosure is not limited to the above-described embodiments. For example, instead of or together with the correction process, a notification process of notifying of the determination result may be performed.

(3e) The controller 6 and the method disclosed in the present disclosure may be achieved by a dedicated computer configured by a processor and a memory, which are programmed to execute one or more functions embodied by computer programs. Alternatively, the controller 6 and the method disclosed in the present disclosure may be achieved by a dedicated computer provided by configuring a processor with one or more dedicated hardware logic circuits. Alternatively, the controller 6 and the method disclosed in the present disclosure may be achieved by one or more dedicated computers configured by combining a processor and a memory programmed to execute one or more functions and a processor configured by one or more hardware logic circuits. Additionally, the computer program may be stored in a non-transitory, tangible computer-readable storage medium as instructions to be executed by a computer. A method for achieving the functions of sections included in the controller 6 does not necessarily have to include software, and all the functions may be achieved by one or more pieces of hardware.

(3f) Multiple functions of one component in the above-described embodiments may be achieved by multiple components, or one function of one component may be achieved by multiple components. Alternatively, multiple functions of multiple components may be achieved by one component, or one function achieved by multiple components may be achieved by one component. A part of the structure of the above-described embodiments may be omitted. Alternatively, at least a part of the structure of the above-described embodiments may be added to or replaced with the structure of the above-described other embodiments.

(3g) Besides the above-described aliasing determination device, the present disclosure may be achieved in various forms such as a system including the aliasing determination device as a component, a program that causes a computer to function as the aliasing determination device, a non-transitory tangible storage medium such as a semiconductor memory that stores the program, and the aliasing determination method.

What is claimed is:

1. An aliasing determination device comprising:
    an information acquisition section configured to repeatedly acquire observation point information of an object that is present within a predetermined detection region from a radar device mounted on a vehicle, the observation point information including an observation point and an observation direction, which is an observed direction of the observation point relative to a designated direction, wherein the designated direction is at least one of a horizontal direction and a vertical direction;
    an axial misalignment acquisition section configured to obtain an orientation of the radar device when the radar device is mounted at a reference position as a reference mounting direction and an actual orientation of the radar device as an actual mounting direction and to acquire an axial misalignment amount of the actual mounting direction with respect to the reference mounting direction toward the designated direction;
    a target object determination section configured to determine whether a target object is present in the reference mounting direction of a vehicle;
    an aliasing calculation section configured to calculate an aliasing direction, which is a direction estimated when there is phase aliasing in the observation direction included in the observation point information; and
    an instantaneous determination section configured to perform a phase aliasing determination in response to the target object determination section determining that the target object is present in the reference mounting direction of the vehicle, the phase aliasing determination determining whether the phase aliasing is present in the observation direction of the observation point,
    wherein,
    the instantaneous determination section is configured to:
        calculate a first difference value which is a difference between the observation direction and the reference mounting direction and a second difference value which is a difference between the aliasing direction and the reference mounting direction;
        when the first difference value is greater than the second difference value, determine that the aliasing direction is closer to the reference mounting direction than the observation direction and the phase aliasing is present in the observation direction of the observation point, and set the aliasing direction as an actual direction of the observation point; and
        when the first difference value is lower than or equal to the second difference value, determine that the observation direction is closer to the reference mounting direction than the aliasing direction and the phase aliasing is absent in the observation direction of the observation point, and set the observation direction as the actual direction of the observation point.

2. The aliasing determination device according to claim 1, further comprising
    a process execution section configured to execute a process in accordance with a determination result of the instantaneous determination section, wherein
    the process execution section executes at least one of a notification process that notifies of the determination result and a correction process that corrects the observation direction in accordance with the determination result.

3. The aliasing determination device according to claim 1, further comprising:
    a reference direction setting section, wherein, when a time series of the observation direction includes a plurality of observation directions that cannot be considered as the same direction, the reference direction setting section is configured to set, as a reference direction, the observation direction in which the observation point information is detected where at least one of a received power and a relative velocity of a moving object is the maximum; and
    a series determination section, wherein, when the observation direction included in the observation point information acquired by the information acquisition section can be considered the same direction as the reference direction set by the reference direction setting section, the series determination section is configured to determine that the observation direction is the actual direction.

4. The aliasing determination device according to claim 1, further comprising
    a movement determination section configured to determine whether an object indicated by the observation point information is associated with a moving object, wherein
    the instantaneous determination section performs the determination in response to the movement determination section determining that the object indicated by the observation point information is associated with the moving object.

5. The aliasing determination device according to claim 1, further comprising
    a directivity determination section configured to determine whether an object indicated by the observation point information is located within a directivity range in which a gain is obtained that is greater than or equal to a threshold value previously set in a radiation pattern of the radar device, wherein
    the instantaneous determination section performs the determination in response to the directivity determination section determining that the aliasing direction is located within the directivity range.

6. The aliasing determination device according to claim 1, further comprising
a traveling determination section configured to determine whether a moving object is traveling straight, wherein
the instantaneous determination section performs the determination in response to the traveling determination section determining that the moving object is traveling straight.

7. The aliasing determination device according to claim 1, further comprising
a target object determination section configured to determine whether a target object is present in the reference mounting direction of a vehicle, wherein
the instantaneous determination section performs the determination in response to the target object determination section determining that a target object is present in the reference mounting direction of the vehicle.

8. The aliasing determination device according to claim 1, further comprising
an axial misalignment detection section configured to detect the axial misalignment amount of the radar device from the observation point information, wherein
the axial misalignment acquisition section acquires the axial misalignment amount from the axial misalignment detection section, and
the axial misalignment detection section detects the axial misalignment amount using the observation point information in which the observation direction is corrected in accordance with the determination result of the instantaneous determination section.

\* \* \* \* \*